Figure 1:
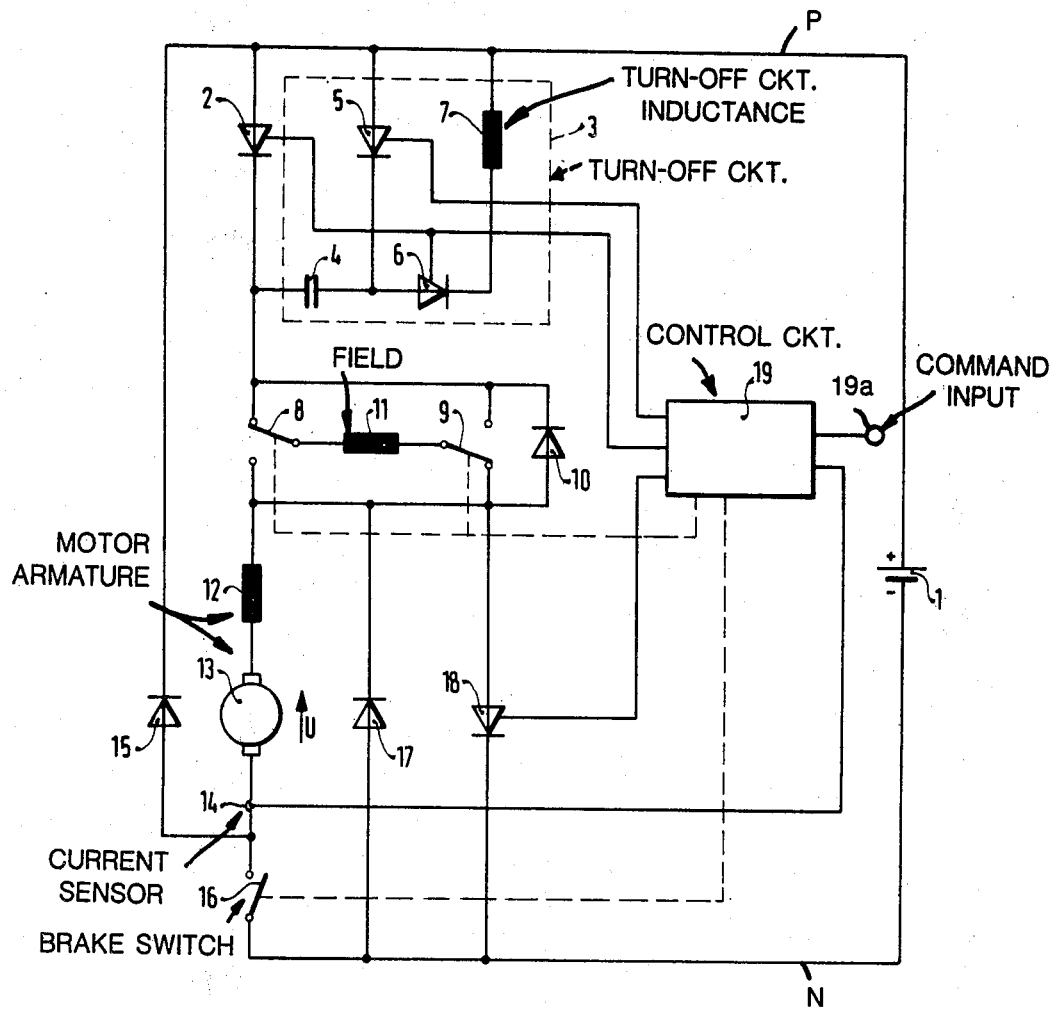

United States Patent [19]

Schwarz

[11] 4,422,021
[45] Dec. 20, 1983

[54] ELECTRIC MOTOR DYNAMIC BRAKING ENERGY RECUPERATING SYSTEM

[75] Inventor: Albrecht Schwarz, Gerlingen, Fed. Rep. of Germany

[73] Assignee: Robert Bosch GmbH, Stuttgart, Fed. Rep. of Germany

[21] Appl. No.: 318,458

[22] Filed: Nov. 5, 1981

[30] Foreign Application Priority Data

Dec. 24, 1980 [DE] Fed. Rep. of Germany ....... 3048999

[51] Int. Cl.³ .............................................. H02P 3/14
[52] U.S. Cl. .................................... 318/376; 318/379; 318/261
[58] Field of Search .............. 318/375, 376, 379, 139, 318/258, 261, 273

[56] References Cited

U.S. PATENT DOCUMENTS

| | | | |
|---|---|---|---|
| 4,132,934 | 1/1979 | Morton et al. | 318/379 X |
| 4,267,492 | 5/1981 | Manners | 318/379 X |
| 4,275,341 | 6/1981 | Huber et al. | 318/376 |
| 4,288,728 | 9/1981 | Niimi et al. | 318/139 |
| 4,323,833 | 4/1982 | Watanabe et al. | 318/376 |
| 4,330,742 | 5/1982 | Reimers | 318/376 X |

*Primary Examiner*—J. V. Truhe
*Assistant Examiner*—W. E. Duncanson, Jr.

*Attorney, Agent, or Firm*—Frishauf, Holtz, Goodman & Woodward

[57] ABSTRACT

To provide for high efficiency of recuperation of energy stored in the rotating and electromagnetic system of a dynamo electric machine, upon dynamic braking thereof, in which the dynamo electric machine is connected in a chopper-controlled series circuit, a field diode (10) is connected across the field winding (11); a controlled switch (18), for example a transistor or a thyristor, is connected to the junction between the field winding (11) and the aramature (12, 13) and a return line (N) to a storage battery, the controlled switch being controlled to close by a control circuit (19) which opens a brake switch (16) connected between the battery and the dynamo electric machine series circuit under motor operating conditions, to provide for continued current flow through the field, which then is reversely connected by a field reversal switch (8, 9), with continued current flow being maintained by a free-wheeling diode (10) connected across the field. The chopper may be a thyristor (2) connected to a turn-off circuit, the turn-off capacitor (4) also furnishing initial field current through the controlled switch (18) or it may be a transistor (2') which is energized to conduction with a slight delay with respect to closing of the controlled switch (18).

8 Claims, 2 Drawing Figures

ELECTRIC MOTOR DYNAMIC BRAKING ENERGY RECUPERATING SYSTEM

The present invention relates to dynamo electric machine systems, and more particularly to a circuit arrangement to recuperate energy from a chopper-controlled series electrical motor under dynamic braking, and return the so recuperated energy to a storage battery, from which the motor receives energy when operating in the motor driving mode.

BACKGROUND

Various types of energy recuperating systems in chopper-controlled series motors are known. For example, it has been proposed to utilize series controlled motors driving, for example, electrically operated vehicles such as fork-lift trucks and the like, by returning energy from the motor, under dynamic braking conditions, to the storage battery. Upon initiation of braking, the field winding of the series motor is switched in polarity. At the same time, a transistor switch is opened which maintains field current to the field winding through a resistor. This system has the disadvantage that the resistor dissipates energy which is not being returned to the battery. The introduction of the resistor, further, causes the current pulses to be less peaked or, in other words, to flatten the current pulses, so that the actual feedback of energy does not commence immediately upon switch-over, but rather some time elapses before energy is fed back to the storage battery. See, for example, literature reference, "Bosch-Druckschrift B9/2, Impulssteuerungen", July 1980, ("Pulse Controllers"), page 17.

THE INVENTION

It is an object to improve the efficiency of energy recuperating systems by eliminating, insofar as possible, all resistive elements, and particulary resistor elements carrying substantial current, so that, effectively, all electromagnetic and mechanical dynamic energy stored in the motor can be returned to the battery when it is decided to brake the motor and the vehicle to which it is connected.

Briefly, a chopper controls a chopping transistor or thyristor, the duty cycle of which is controlled by a control circuit, which is serially connected with the field winding and the armature of a driving motor. A diode is connected across the controlled chopper switch-field-armature circuit, and a diode is connected across the field. The connection terminals to the field are connected through a polarity reversal switch in the series circuit, so that, to effect braking, the polarity of current applied to the field can be reversed.

In accordance with the invention, the field diode is connected across the field winding and a controlled switch is connected to the junction between the field winding and the armature, closing of the switch being controlled by the control circuit when the motor operates under dynamic braking conditions, so that energy can be returned directly from the motor armature to the battery, when the controlled switch is conductive. The chopper switch may be a thyristor or a transistor; and if connected as a transistor, the usual thyristor turn-off circuit can then be omitted.

The system has the advantage that the number of components used for recuperation of energy are a minimum, thus substantially simplifying the control unit. The current rise can readily and rapidly be controlled. The resistance of the network through the field winding is very low, so that current pulses of high amplitude are derived which result in reliable and rapid reverse magnetization of the magnetic circuit of the machine, that is, change-over from motor to generator operation. There are no resistors carrying current at power level, so that the losses are a minimum. Use of a field diode prevents excessive demagnetization of the machine during the recuperation mode of operation.

The chopper circuit itself may either be a thyristor with a customary turn-off circuit, or a transistor without such circuit. Upon energy recuperation, the field reversal is obtained not by energy stored in the turn-off capacitor but, rather, by a longer opening time of the chopper switch, for example the chopper transistor. When using a transistor, therefore, it is desirable to include a short time delay circuit in its control network, for example in its base connection.

It is desirable to provide a diode across the armature, connected in parallel to the controlled switch. Such a diode has the advantage that it is conductive in only one direction so that current generated by the generator can flow into the battery without requiring that it be switched.

In a preferred form, the switch between the field and the armature is a thyristor, which results in a particularly simple control network, particularly when combined with a chopper switch in the form of a thyristor and the associated turn-off circuit. After re-charging in reverse direction of the turn-off capacitor of the turn-off circuit, current through the thyristor switch collapses so that the thyristor extinguishes by itself and additional turn-off or control circuits or networks for the controlled switch are not needed. It is, however, also possible to construct the switch as a transistor switch which may be desirable in low-power installations. The turn-off instant of the transistor can be selected within wide limits and thus the control unit itself can be of simple and inexpensive construction.

DRAWINGS

Figure 2:
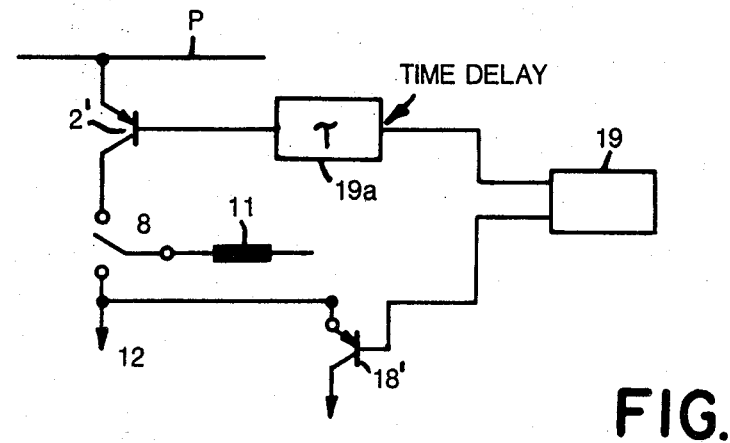

FIG. 1 is a schematic circuit diagram of the recuperating system applied to a series motor; and FIG. 2 is a fragmentary diagram illustrating modifications using a transistor circuit.

A battery 1—see FIG. 1—has its positive and negative terminals connected between buses P and N. The negative bus may also be termed a ground or chassis bus. The positive bus P is connected to a chopper thyristor 2. A turn-off circuit 3 is provided, connected to the other terminal of the chopper thyristor 2. The turn-off circuit 3 can be constructed in various ways; in the example shown, a turn-off thyristor 5 is connected to the positive bus P; a turn-off circuit inductance 7, likewise, is connected to the positive bus P. The other terminal of the inductance 7 is connected through a further thyristor 6 to a junction between the turn-off capacitor 4 and the other main terminal of the turn-off thyristor 5. The remote terminal of the turn-off capacitor 4 is connected to the second terminal of the chopper thyristor 2.

The chopper thyristor 2 is further connected to one end terminal of a polarity reversal switch formed by transfer switches 8, 9. The center or transfer terminal of switch 8 is connected to field winding 11 of a series motor 13. The second terminal of the field winding 11 is connected to the transfer terminal of switch 9. The fixed terminals of the switches 8, 9 are connected in pairs, with the transfer terminals being oppositely directed, as shown in FIG. 1. A field diode 10 is connected across the fixed terminals of switches 8, 9, so that the diode is connected across the field through the respectively poled switches. The switches 8, 9 operate in unison, with the switch positions being so arranged that the current flow through the field winding 11 can be reversed.

The armature 13 of the motor, in which the armature winding 12 is shown separately, is connected to the common connecting line at the other side of the fixed terminals of the switches 8, 9. The motor 13, more exactly the dynamo electric machine 13, can operate in motor mode or in generator mode. A current sensor 14 is connected from the other terminal of the dynamo electric machine 13. A feedback diode 15 is connected beyond the current sensor 14 to the positive bus P, and hence with the positive terminal of the battery 1. A brake switch 16 is connected between the junction of the connecting line from the dynamo electric machine 13, and beyond the current sensor, and the negative bus N. An armature diode 17 is connected in parallel with a controlled switch 18 which, as shown, is a thyristor which is reversely polarized with respect to the armature diode 17.

A control circuit 19 is provided, receiving input commands from a terminal 19a and determining the duty cycle, that is, the switching-ON or switching-OFF instants of the chopper thyristor 2. The control circuit 19 controls the respective thyristors and switches. The gate or control electrodes of the thyristors 2 and 6 are connected to the control circuit 19; thyristors 5 and 18 have their own control connection. The control circuit 19 further controls operation of the switches 8, 9 and the break switch 16. The control circuits receives an actual-current signal from the current sensor 14 and a command current signal from the input 19a which, for example, may be coupled to an operating pedal or handle, for manual command of the mode of operation of the dynamo electric machine 13 that is, whether under forward or under braking or reverse operation, and the speed thereof. Control circuits of this type are known, and various suitable units and types may be used; one such unit is described in the aforementioned literature reference.

Operation: Let it be assumed that the circuit is used in a series motor connected to an electric vehicle. In operation, and upon receiving a suitable signal from control circuit 19, current through the dynamo electric machine 13 is chopped. The duty cycle of the current is commanded by a suitable signal at the command input 19a to the control circuit, which provides a command value for the control circuit, the actual value of the current, however, being measured by the current sensor 14. The dynamo electric machine, now operating as a motor, is operated under chopper control. The duty cycle, that is, the pulse vs. pulse-gap time, can readily be changed. The control circuit 19 provides suitable control signals to fire the thyristors 2 and 6 if the motor is to be supplied with current. This also results in charging of the turn-off capacitor 4. The turn-off capacitor 4 is discharged by energization of the transistor 5, which causes a reverse charge of the capacitor and reverse current flow through the thyristor 2, causing thyristor 2 as well as thyristor 6 to extinguish. Thyristor 2 is blocked upon firing of thyristor 5, since due to the reverse recharging of the capacitor 4, thyristor 2 loses current and blocks. Break switch 16, under normal operating conditions, is closed.

If it is desired to brake the vehicle, switch 16 is, first, opened. This results in loss of energization of the dynamo electric machine 13. For breaking, however, the magnetic field in the machine must be reversed, which means that a reverse current must flow through the field winding 11, the reverse current depending on machine operation. The two transfer switches 8, 9 are operated in synchronism, which reverses current flow through the field winding 11. The thyristor 18, as well as the turn-off thyristor 5, are both fired. The energy stored in the turn-off capacitor causes the chopper transistor 2 to turn OFF. There is sufficient energy stored in the capacitor 4 to cause current flow through the field winding 11 over thyristor 18 which causes initial excitation of the machine 13. The current in capacitor 4, however, will drop to zero. After the current in capacitor 4 has dropped to zero, that is, when the voltage across capacitor 4 is equal to battery voltage, thyristor 18, by its own, will extinguish, since it will no longer have a holding potential; field diode 10, however, will then become conductive, and the field will continue to have current flow therethrough.

After a suitable time, as determined by the control circuit 19, for example under command of a command input at terminal 19a controlling the extent of braking, thyristor 2 is again fired. If the voltage at the armature is higher than the sum of the quiescent voltage of thyristor 2 and diode 15, the current in armature winding 13 and field winding 11 rises rapidly to provide a current avalanche which initiates the energy recuperation or energy feedback. The control unit 19 by suitable input at its command 19a, for example, may increase the duty cycle at the next subsequent cycling period until the current flowing through the armature of the machine 13 has reached the appropriate value, as sensed by current sensor 14 and transmitted to the control circuit 19. At each extinction of main chopper thyristor 2, that is, each time upon firing of thyristors 5 and 18, field 11 will receive energy from the battery for excitation of the machine. The delay time until recuperation thus is determined solely by the machine and its characteristic data. The field diode 10 is a free-wheeling or parallel diode which carries field current during the period when the thyristors 2, 5 and 18 are blocked or non-conductive. The rotation of the motor 13, and the reverse excitation of the field winding 11, induces a voltage in motor 13 which, on the one hand, is connected via diode 15 to the positive bus P and hence to the positive terminal of the battery 1 and, further, through diode 17 to the negative bus N, and then to the negative terminal of the battery. The current flow in the circuit: P-15-14-13-12-17-N-battery 1 causes recharging of the battery.

In order to maintain excitation of the field winding 11, feedback under pulsed operation is effected by the chopper thyristor 2.

The series circuit: chopper thyristor 2-field 11-motor 12, 13-current sensor 14-feedback diode 15 is periodically short-circuited by the thyristor 2. The voltage U across the machine 13 then will cause current flow in the entire network which rises in avalanche form due to the direct coupling between armature and field. When this current has risen to a value determined by the control circuit 19, for example under command of a command input signal at terminal 19a, and as sensed by current sensor 14, chopper thyristor 2 is extinguished, as above described, by a control pulse from the control circuit 19. The energy stored in the armature winding is discharged over diodes 15, 17 into the battery 1; excitation in field winding 11 is maintained by the circuit then closed by the diode 10 which is poled to be conductive under this operating condition.

The field 11 has very low resistance. The circuit, thus, provides current pulses of high amplitude, which permits reliable remagnetization or reverse magnetization of the dynamo electric machine. The control speed of the circuit is fast, since the duty cycle determined by the control circuit 19 need be increased only to the extent which is necessary to initiate the recuperation cycle. The avalanche-like current rise is continuously monitored by the current sensor 14. The thyristor 18 extinguishes on its own after the discharge cycle has run its course. Additional protective resistors are not necessary since, during the recuperation cycle, the avalanche effect will not occur in the serial dynamo electric machine, because the field winding 11 has its own freewheeling diode 10, and the current in the field winding 11 due to the discharge of the magnetic field in the field winding does not increase, but can only decrease. The particular arrangement of the field free-wheeling diode 10 has the effect that too high demagnetization of the machine does not occur during the recuperation cycle, since the field winding 11 is almost completely short-circuited by the diode 10.

Determination of the recuperation cycle can be easily determined from the duty cycle of the pulsing of the power thyristor 2 as commanded by the control circuit 19. The vehicle, after no more energy can be recuperated, is completely stopped by counter current application, with brake switch 16 closed.

Various changes and modifications may be made. Different turn-off circuits may be used than that which has been described. If, instead of the chopper thyristor 2, a transistor is used, the turn-off circuit can be eliminated. The excitation energy can then not be derived from the turn-off capacitor 4, and it is thus necessary that when a chopper transistor is used, the transistor still be open when the thyristor 18 fires. The opening time should be selected to be so long until the excitation of the field current 11 has changed. The transistor thus should be closed or rendered conductive only shortly after firing of the thyristor 18. The time delay depends on the motor which is being used, or, respectively, on its field winding.

The further circuit conditions will be as above described. Thyristor 18 can also be replaced by a transistor. The transistor, then, has to be commanded or controlled to be conductive similarly to the thyristor 18. Since the current through the thyristor 2, or through an equivalent thyristor is interrupted, it is not necessary to turn off a transistor which is used to replace the thyristor 18. Other pulses may be used, which are already derived or available in the control circuit 19. The transistor is short-circuited by the diode 17 with respect to the recuperation current.

FIG. 2 illustrates the variation in which both changes —replacement of chopper thyristor 2 by a transistor, and replacement of switching thyristor 18 by a transistor—are shown in a single figure although, selectively, only the thyristor 2 or the thyristor 18 can be replaced by a transistor. In FIG. 2, elements which conform to those described in connection with FIG. 1, have been given the same reference numeral, and similarly operating elements the same reference numeral with prime notation. Thus, thyristor 2 is replaced by a transistor 2'; thyristor 18 by a transistor 18'; and a time delay circuit 19a is connected in series between the control circuit 19 and the transistor 2' to effect the time delay with respect to the control pulse applied to the thyristor 18 or transistor 18', as the case may be. Of course, the time delay 19a can be incorporated within the control circuit 19 or a suitably delayed pulse generated in a modified control circuit.

I claim:

1. Energy recuperating system to return energy from a series dynamo electric machine (11, 12, 13) to an energy storage battery (1) upon dynamic braking operation of the dynamo electric machine, said dynamo electric machine having a series circuit including a field winding (11) and an armature (12, 13);

said system further including a chopper switch (2) connected in series between the storage battery (1) and said dynamo electric machine;

a control circuit (3, 19) connected to and controlling the duty cycle of the chopper switch (2) to control the average current flow to the dynamo electric machine;

a field polarity reversal switch (8, 9) connecting, selectively, the field winding in, respectively, reverse directions, with respect to current flow through the armature;

and a reverse current diode (15) connected across the series circuit formed by the field winding (11) and the armature (12, 13), and comprising, in accordance with the invention, a field diode (10) connected across the field winding (11);

and a controlled switch (18) connected to the junction between the field winding (11) and the armature, and to a return line (N) to the storage battery, closing of said controlled switch (18) being controlled by said control circuit (19) when the motor is operating under dynamic braking conditions and to return energy to the storage battery.

2. System according to claim 1, wherein said chopper switch (2) is a thyristor, and the control circuit includes a thyristor turn-off circuit.

3. System according to claim 2, wherein the turn-off circuit includes a turn-off capacitor (4);

and the control circuit includes a control circuit portion (19) providing turn-off signals to the turn-off circuit and to said controlled switch (18) in synchronism, discharge of the turn-off capacitor (4) also, in part, causing decaying current flow through said controlled switch (18).

4. System according to claim 1, wherein said chopper switch (2) comprises a transistor (2').

5. System according to claim 4, wherein said control circuit includes a time delay portion (19a) and a control pulse portion (19), said control pulse portion providing turn-on control pulses to said controlled switch (18), the time delay portion (19a) being connected in the base circuit of said transistor (2') to delay pulses thereto with respect to the pulses to said controlled switch (18').

6. System according to claim 2 or 4, further including an armature diode (17) connected in parallel to said controlled switch (18, 18') and poled to be conductive when the dynamo electric machine is in generator or dynamic braking mode of operation.

7. System according to claim 2 or 4, wherein said controlled switch comprises a thyristor.

8. System according to claim 2 or 4, wherein said controlled switch comprises a transistor (18').

* * * * *